Patented Oct. 24, 1950

2,527,210

UNITED STATES PATENT OFFICE 2,527,210

HEMOGLOBIN SOLUTION AND METHOD

John O. Bower, Wyncote, Pa.

No Drawing. Application January 25, 1944,
Serial No. 519,686

6 Claims. (Cl. 106—161)

My invention relates to hemoglobin solutions, that is to say, solutions comprised of the content of human blood cells, that substance contained within the blood cell walls.

This application is a continuation-in-part of my application Serial No. 502,503, filed September 15, 1943, now Patent No. 2,493,943.

The prime object of my invention is to obtain an hemoglobin solution uncontaminated at any time in its preparation by matter foreign to the blood itself.

In the past hemoglobin solutions have been prepared by breaking the blood cell walls and by treating the blood with reagents foreign to the blood. Distilled water, ether, chloroform, soap, fatty acids, bile acids, saponin, snake venom, and specific hemolysins and other reagents have been variously used or proposed. Their action is gradual. They have to be subsequently removed if the hemoglobin solution is to even approach its original purity. Both they and the broken blood cell walls are removed. My invention is a solution and the method of producing it respectively free of such reagents and other matter foreign to the blood and the use of any of them.

A further object of my invention is the effecting of the solution under conditions which preclude to a very maximum degree contamination either from atmosphere or from handling.

The objects of my invention I attain outstandingly by mechanically instead of chemically dissolving the cell walls. I comprise the solution of hemoglobin containing blood cell walls mechanically dissolved to submicroscopic fineness.

The method I use consists of freezing at such an extreme rate and at such a low degree that the cell walls are submicroscopically divided, reduced to a state of complete structural dissolution, and enter into solution with the liquid content of the blood when the frozen mixture is thawed. The thawed such solution is the product of my invention.

The method and the product are thus intimately inter-related.

More specifically, my method is the following:

Blood is drawn from a donor by the closed method, a well-known method in which there are no contacts of the blood with outside air. It is drawn into a donor bottle either with or without sodium citrate, the usual intake tubing, needle, outlet tubing and cotton filter being employed. As soon thereafter as possible this blood is centrifuged and the supernatent plasma or serum withdrawn, this centrifuging and withdrawal likewise being by the closed method. The red cell residue is that which I use. It may be used at any time after plasma extraction before it becomes spoiled. It will keep well in atmosphere at room temperature for some days, and will keep several weeks in a refrigerator.

I pour this residue into a suitable container and place it in a bath of Sunoco spirits and dry ice, where it is allowed to remain until frozen solid. (Sunoco spirits is a petroleum hydrocarbon marketed by the Sun Oil Company, and is similar to a highly refined kerosene in its properties.) The temperature to which the red cell mixture is frozen and the rate of such freezing are those which produce the same results as are obtained by immersing for from two to three minutes a 30 cc. glass test tube filled with red cell mixture in a bath of Sunoco spirits and dry ice maintained at the temperature of substantially 85° below zero F. This results in a submicroscopic dissolution of the cell walls, a dissolution of such fineness that when the solution is permitted to thaw, the dissolved cell walls enter into the liquid content of the red cell mixture in submicroscopic suspension or otherwise so completely and pervasively that cell wall structure cannot be differentiated from the remaining content of the solution. As removed from the bath the solid frozen material is dark pink in color rather than red, and the surface of the solid is in the center elevated above its original surface level. In a 30 cc. test tube treatment the elevation is in the form of a nipple-like projection. If the red blood cell mixture contains a substantial percentage of plasma, it will be observed in this elevated portion of the mixture, and the elevated portion will be somewhat lighter in color than the main body. The mixture so frozen is removed from the solution at the completion of its freezing and is permitted to thaw (preferably a gradual thawing to prevent damage to containing vessels), whereupon one has the product of my invention—the hemoglobin solution comprised of the protein and other content of blood cells and the mechanically dissolved cell walls.

In the product of my invention I believe the mechanically dissolved cell walls are carried in a state of suspension. The solution appears to be colloidal. By my method the dissolution of the cell walls is achieved to such a high degree of fineness that the suspended cell wall matter cannot be differentiated from the hemoglobin matter with microscopes of ordinary power, though perhaps they can be differentiated by using microscopes of high power. In referring to microscopes of ordinary power, I have in mind the conventional laboratory instrument, which is capable of producing magnifications of from 100 diameters up to 600 or even 900 diameters. However, the degree of fineness of the dissolution of the cell walls may vary without departing from my invention, either its method phase or its product phase. I can, for example, regulate the degree of fineness of the dissolution of the sub-microscopic dimensions by changing the temperature at which the cell walls are frozen and the rate of such freezing.

This product of my invention has many uses, some of which are more fully developed in other copending applications. Prominent among such uses are intravenous injection into the human blood stream; application as a solution to both clean and aseptic wounds; the coating or impregnating of bone, tissue, or other filling as applied to a wound; the coating or impregnating of sutures of every description, particularly of sutures composed of animal fiber such as the well-known catgut sutures; and a synthetic spinning of the main bodies of sutures from my hemoglobin solution itself.

When injected into the human blood stream it affords the blood making processes of the human body the materials with which to make fresh blood and replenish the blood supply and so nourish and strengthen the body. For injection the solution is brought by plasma additions to the same concentration as the blood of the patient. It is my belief that the complete destruction of the blood cells destroys altogether the type of the original blood from which the solution was derived and renders the solution completely adaptable to the type of blood of the individual subjected to the injection. From this standpoint an injection practice utilizing my solution has a marked advantage over and above ordinary transfusion practices which are handicapped in adaptability by complete subjection to type.

In all following uses the solution constitutes a wound healing product of great value in medicine. Outstandingly, this is because it contains practically all of the constituents used by the human body in its processes of healing. It contains them in a state more nearly approaching the ideal state than any other such solution thus far discovered. Moreover, these constituents are in a state of substantially perfect purity, free alike from bacteria and irritating or retarding foreign substances. This is by reason, first, that the closed methods of deriving the red blood cell mixture and the following freezing at extreme sub-zero temperatures respectively prevent entrance of bacteria and inhibit bacteria growth, and, second, that no substance whatever other than the blood substance is introduced to the mixture or the original solution. The chemicals of the old-fashioned solutions are avoided altogether.

As applied locally to either clean or unclean wounds either before or after the making or occurrence of the wound, the solution is poured, painted, or otherwise spread on in a relatively viscous state. It dries rapidly, presenting a smooth, varnish-like superior surface. Several applications may be made to produce a covering or filling of any desired thickness. The viscosity may be controlled by adding blood plasma to reduce it, or taking out plasma and water content to increase it. The water content of the red blood cell residue from plasma production from human blood is 50 to 60% and the plasma content but a few percent, the great bulk being removed by the centrifuging process of plasma extraction. For ordinary shallow wounds such as cuts and abrasions, a very light applied coating quickly forms a skin which so protects the wound as to render necessary but a very light dressing. It penetrates the epidermis without irritation and strongly adheres to it, effectively sealing the sides of any superficial wound to the adjoining skin. This quality makes it an especially valuable substitute for iodine in preparing the epidermis areas adjoining the location of an intended incision, and guarding the wound against infection.

As a coating for fillings or applications of bone or tissue or other wound-filling substance to be grown to or into the body, it provides directly in the joint between the applied material or filling the substance of which the joint itself is ultimately to be made by the body processes. The body processes absorb this material without the slightest irritation to the wound or the adjoining body parts. Applications of the solution to these ends can be made by pouring or painting upon the open wound, precoating the application or filling by dipping, soaking, painting, or otherwise placing upon or within the wound, injecting the solution between the filling or application and the wound by suitable injection means, or by any other convenient means.

In the treatment of existing sutures of animal fiber or other such material, I usually immerse the suture for varying periods of time in the solution, the time of immersion depending upon the nature of the suture and whether I desire a simple coating of the material upon it or whether I desire the suture to be thoroughly impregnated. I have used all of these methods on different kinds of sutures, notably upon catgut sutures but also sutures of silk, of casein, and of other materials. I have applied coatings of different thicknesses and impregnations of different degree. I have subsequently embedded these sutures in the stomach walls of rabbits and taken microscopic sections at different periods of the healing. In all cases I have found highly beneficial results. The healing in the case of coated or impregnated catgut sutures occurs in a minimum time and with minimal irritation to the walls through which the suture passes. The absorption is rapid and the time only a minor fraction of that required when ordinary such sutures are similarly used. In the case of impregnated sutures of silk, while untreated such sutures are relatively unabsorbable, the indications are that the impregnated silk suture is rendered absorbable, in whole or in part, and in any case that they produce a veritable minimum of irritation.

Finally, I have synthetically spun sutures of this solution and embedded these synthetically spun sutures in the stomach walls of rabbits and found them still more readily absorbed than the solution impregnated catgut (but yet taking amply adequate absorption time to permit proper healing) and accompanied by a still more thorough healing process. In synthetically spinning this solution I modify it by introducing sodium sulphide to carry the cell walls already in solution by suspension as well into chemical solution. I introduce to my original hemoglobin solution above described a 20% solution of sodium sulphide in the proportion of one part by volume to approximately three parts of the original hemoglobin solution in which the cell walls are mechanically dissolved. This I introduce through a suitable spinning nozzle into a suitable precipitant, forming a suture of adequate cross-section. This precipitated suture I then introduce to a setting bath following a general order of steps such as very commonly used in spinning synthetic filaments.

Obviously both the product of my invention (the solution) and the method of producing it, intimately related though they are, are each subject to modification without in any wise departing from the generic spirit of my invention. For example, animal blood cells other than human blood cells may be used in certain cases. So also are the various and sundry utilizations of it. Likewise the manner of handling it may be varied without departing in any wise from the generic spirit.

Speaking of the manner of handling, it is to be remarked that one of the outstanding merits of my invention is the aseptic character of the solution. It will keep fresh and free from deterioration, bacteriologically or otherwise, for long periods of time. It possesses naturally a very high resistance to deterioration, and aided by known processes of refrigeration and other protections may be kept indefinitely. Coated or impregnated sutures keep well either wet or dry. Wet they may be preserved in xylol as readily as any other suture. Dry, either as coated or impregnated, the superficial coating is tenaciously adherent and presents a smooth, bright, protective surface free from cracking when bent, like a pliable varnish or enamel.

Irrespective of the circumstantial nature of the terminology of the annexed claims, the intent of this specification and claims is to protect to myself my invention in all the fullness of its generic spirit. For example, so long as the primary characteristics of the solution are not substantially impaired thereby, various additions to it may be made. The expression "consisting essentially," in the claims which follow, is not to be construed as excluding the presence of such additions.

What is claimed is:

1. The method of preparing an hemoglobin solution comprising blood cell structure, which method consists of freezing the blood cells to a temperature and at a rate of freezing corresponding to that resulting from the immersion of a 30 cc. test tube containing blood cells in a freezing solution at approximately −85° F. for from two to three minutes.

2. The liquid of claim 5, in which the sodium sulfide constitutes about 5% of the total volume.

3. The method of preparing an hemoglobin spinning solution comprising the elements of blood cell structure, which method comprises freezing and thawing the blood cells at a rate and to a temperature yielding the same results as follow the immersion of a 30 cc. test tube filled with red cell mixture in a bath of "Sunoco Spirits" and dry ice at substantially −85° F. for from 2 to 3 minutes, thawing the mixture, and adding an aqueous solution of sodium sulfide.

4. The method of claim 3, in which the sodium sulfide is added in proportions of about one part of a 20% aqueous solution thereof to about three parts of blood cell mixture.

5. A spinnable liquid consisting essentially of sodium sulfide and a constituency of blood which has been frozen at a rate and to a temperature yielding the same results as follow the immersion of a 30 cc. test tube filled with red cell mixture in a bath of "Sunoco" spirits and dry ice at substantially −85° F. for from two to three minutes, and subsequently thawed.

6. A solution consisting of a frozen and thawed material selected from the group which consists of whole blood, whole blood from which serum has been separated, citrated whole blood, and citrated whole blood from which plasma has been separated, which solution has the elements of stroma in a state of dissolution in blood cell content and has throughout the clarity and filtering characteristics which result upon the freezing of red blood cell mixture in a 30 cc. test tube in a freezing solution at about −85° F. for from 2 to 3 minutes, followed by thawing of such frozen mixture.

JOHN O. BOWER.

REFERENCES CITED

The following references are of record in the file of this patent:

UNITED STATES PATENTS

| Number | Name | Date |
|---|---|---|
| 1,380,427 | Sgalitzer | June 7, 1921 |
| 2,287,028 | D'Ambrosio et al. | June 23, 1942 |

FOREIGN PATENTS

| Number | Country | Date |
|---|---|---|
| 165,832 | Great Britain | July 11, 1921 |
| 422,990 | Great Britain | June 23, 1935 |
| 6,700 | Great Britain | of 1898 |

OTHER REFERENCES

J. Biol. Chem., vol. 57 (1932), p. 820, Amer. J. Surgery, Jan. 1943, pp. 104–5.

Wood: "Sounds That Burn," Sci. Amer., Mar. 1928, pp. 201–4.

Handbook of Chem. & Physics, 28th Ed., P. 1738, Chem. Rubber Pub. Co., 1944.

Comptes rendus de la Societe de Biol. 52, 1900, p. 453.

Annales de Medicine legale (1939), pp. 206–8.

Comptes rendus de la Societe de Biol. (1938), pp. 14 and 15.

Certificate of Correction

Patent No. 2,527,210 October 24, 1950

JOHN O. BOWER

It is hereby certified that error appears in the printed specification of the above numbered patent requiring correction as follows:

Column 6, list of references cited, line 47, for "June 23, 1935" read *January 23, 1935*; line 51, for "(1932)" read *(1923)*; line 59, for "(1939)" read *(1938)*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*